(12) United States Patent
Hyun

(10) Patent No.: US 7,374,120 B2
(45) Date of Patent: May 20, 2008

(54) ANTI-BACKLASH APPARATUS FOR BAIT REEL

(75) Inventor: Kwang Ho Hyun, Buchun (KR)

(73) Assignee: Doyo Engineering Co., Ltd. (KR)

( * ) Notice: Subject to any disclaimer, the term of this patent is extended or adjusted under 35 U.S.C. 154(b) by 32 days.

(21) Appl. No.: 11/640,795

(22) Filed: Dec. 18, 2006

(65) Prior Publication Data

US 2007/0295848 A1  Dec. 27, 2007

(30) Foreign Application Priority Data

Jun. 23, 2006  (KR)  ................ 20-2006-0016910 U

(51) Int. Cl.
*A01K 89/02* (2006.01)

(52) U.S. Cl. ...................... 242/289; 242/286

(58) Field of Classification Search ................ 242/285, 242/286, 289
See application file for complete search history.

(56) References Cited

U.S. PATENT DOCUMENTS 6,371,396 B1 * 4/2002 Kawasaki .................. 242/289
6,435,438 B1 * 8/2002 Hyon ........................ 242/289
6,908,054 B1 * 6/2005 Kim et al. .................. 242/289
6,955,315 B2 * 10/2005 Hyun ........................ 242/289
6,957,787 B1 * 10/2005 Rho .......................... 242/289
6,959,886 B1 * 11/2005 Rho .......................... 242/289
6,966,517 B2 * 11/2005 Seo ........................... 242/289
2006/0060687 A1 * 3/2006 Lee ............................ 242/289

* cited by examiner

*Primary Examiner*—Evan H. Langdon
(74) *Attorney, Agent, or Firm*—Tuchman & Park LLC

(57) ABSTRACT

Provided is an anti-backlash apparatus for a bait reel. The apparatus includes a brake shoe holder, a plurality of brake shoes, a stopper, a stopper holder, and locking parts. The brake shoe holder connects to a shaft of a spool. The plurality of brake shoes are radially fitted to the brake shoe holder, move outside, and get friction with a brake ring. The stopper is provided at one side of the brake shoe holder, and restricts movements of the brake shoes. The stopper holder connects to the stopper, and elastically reciprocates and moves left/right by a tension force of the spring. The locking parts are vertically bent at one-side ends of the brake shoes, and are locked at an inner circumference surface of the stopper, and restrict the movement of the brake shoe.

5 Claims, 6 Drawing Sheets

ANTI-BACKLASH APPARATUS FOR BAIT REEL

BACKGROUND OF THE INVENTION

1. Field of the Invention

The present invention relates to an anti-backlash apparatus for a bait reel, and more particularly, to an anti-backlash apparatus for a bait reel, for stepwise and delicately controlling a rotary force of a spool outside even with a side cover not disassembled.

2. Description of the Related Art

In general, a bait reel mainly used for lure fishing includes a reel frame; a spool rotatably installed at the reel frame and winding a fishing line; a handle provided at one side of the reel frame and rotating and driving the spool; and a side cover connecting to the other side of the reel frame.

An anti-backlash apparatus is provided within the side cover. The anti-backlash apparatus refers to an apparatus for controlling a rotation of the spool rotating at a high speed at the time of casting a lure or bait, thereby preventing a fishing line to be excessively unwound and entangled at the spool.

As a conventional art related with the anti-backlash apparatus, there is a method in which a brake shoe stands out of by a centrifugal force of a spool within a side cover, and contacts with a fixed brake ring, thereby causing a friction force and braking the spool. However, in this method, when a brake power against the spool changes, the side cover should be necessarily separated and then, the brake shoe should be controlled in position. Thus, much troublesomeness in use is caused.

As a prior art for solving the above drawback, there is Korean Utility Model Registration No. 20-0381861 filed on Feb. 11, 2005 by this inventor and registered on Apr. 6, 2005.

The earlier registered Utility Model has an advantage that a brake ring causing friction with a brake shoe is controlled in position depending on an operation of a dial mounted at a side cover, thereby controlling a rotary force of a spool such that, even though the side cover is not disassembled, the rotary force of the spool can be controlled.

However, the earlier registered Utility Model is expected to have a drawback in that, since an internal space of the side cover for installing the brake ring is limited, the brake ring is only restrictively changed in position and thus, a brake power against the spool cannot be controlled in several steps.

Further, the earlier registered Utility Model is expected to have a drawback in that, if a motion of the brake ring is not accurate, a noise is caused when the brake power against the spool is generated.

SUMMARY OF THE INVENTION

Accordingly, the present invention is directed to an anti-backlash apparatus for a bait reel that substantially overcomes one or more of the limitations and disadvantages of the conventional art.

One object of the present invention is to provide an anti-backlash apparatus for a bait reel, for controlling a rotary force of a spool outside even with a side cover not disassembled.

Another object of the present invention is to provide an anti-backlash apparatus for a bait reel, for stepwise controlling a brake power against a spool in several steps.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims as well as the appended drawings.

To achieve the above and other objects and advantages, and in accordance with the purpose of the invention, as embodied and broadly described herein, there is provided an anti-backlash apparatus for a bait reel, provided within a side cover of the bait reel and stepwise controlling a rotary force of a spool by a rotation operation of a dial provided at the side cover. The apparatus includes a brake shoe holder, a plurality of brake shoes, a stopper, a stopper holder, and locking parts. The brake shoe holder connects to a shaft of the spool. The plurality of brake shoes are radially fitted to the brake shoe holder, move outside depending on a rotation of the spool, and get friction with a brake ring. The stopper is provided at one side of the brake shoe holder, and restricts movements of the brake shoes. The stopper holder connects to the stopper, and elastically reciprocates and moves left/right by a tension force of the spring depending on the rotation operation of the dial. The locking parts are vertically bent and provided at one-side ends of the brake shoes, and are locked at an inner circumference surface of the stopper, and restrict the movement of the brake shoe. The locking parts 24a are provided at lengths different from each other such that they can be stepwise released from or restricted by the stopper depending on the movement of the stopper. The restricted brake shoe and stopper rotate when the spool rotates.

It is to be understood that both the foregoing summary and the following detailed description of the present invention are merely exemplary and intended for explanatory purposes only.

BRIEF DESCRIPTION OF THE DRAWINGS

The accompanying drawings, which are included to aid in understanding the invention and are incorporated into and constitute a part of this application, illustrate embodiment(s) of the invention and together with the description serve to explain the principles of the invention. In the drawings.

DETAILED DESCRIPTION OF THE INVENTION

Figure 1:
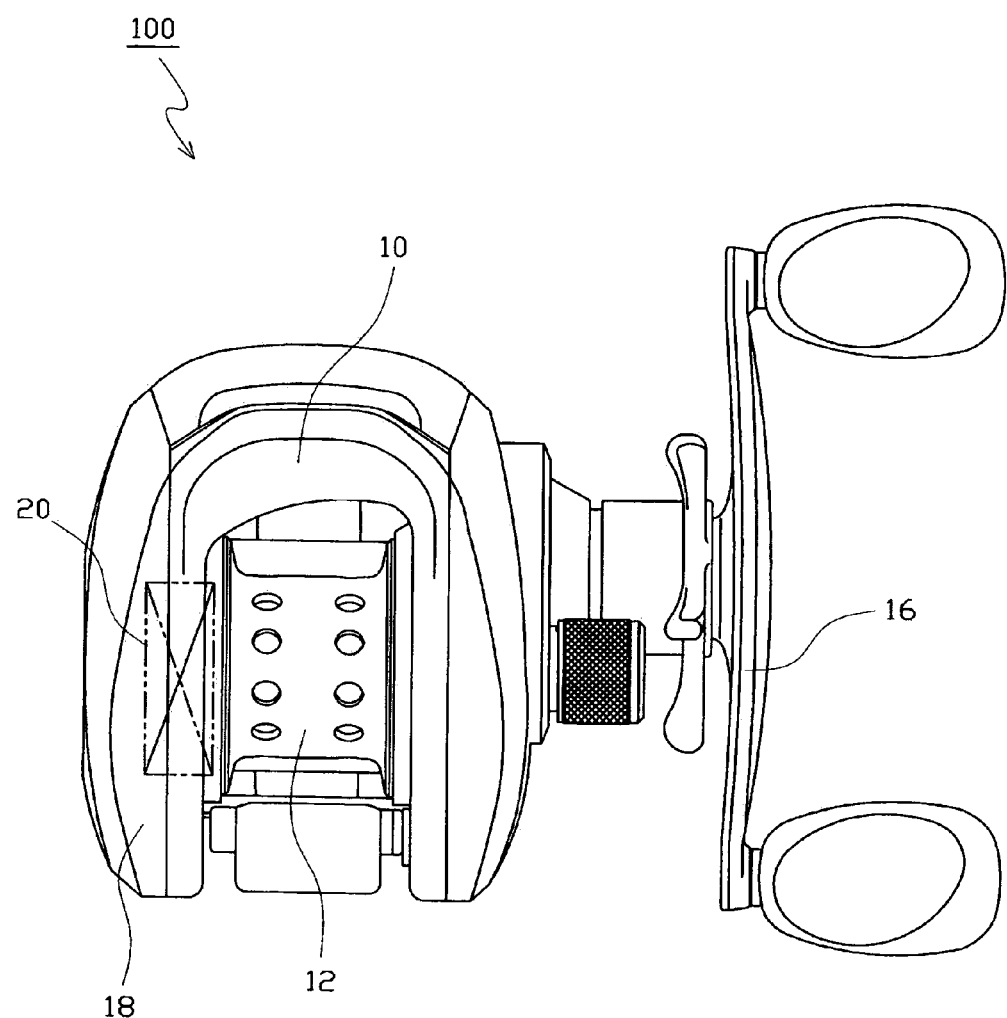
FIG. 1 is a front view illustrating a whole structure of a bait reel according to the present invention.

Reference will now be made in detail to the preferred embodiments of the present invention, examples of which are illustrated in the accompanying drawings. Wherever possible, the same reference numerals will be used throughout the drawings to refer to the same or like parts.

FIG. 1 illustrates a bait reel 100 according to the present invention.

As shown in FIG. 1, the bait reel 100 includes a reel frame 10; a spool 12 rotatably provided at the reel frame 10 and winding a fishing line thereon; a handle 16 provided at one side of the reel frame 10, and rotating and driving the spool 12; and a side cover 18 connecting to the other side of the reel frame 10.

An anti-backlash apparatus 20, a means for stepwise controlling a rotary force of the spool 12, is provided within the side cover 18.

Figure 2:
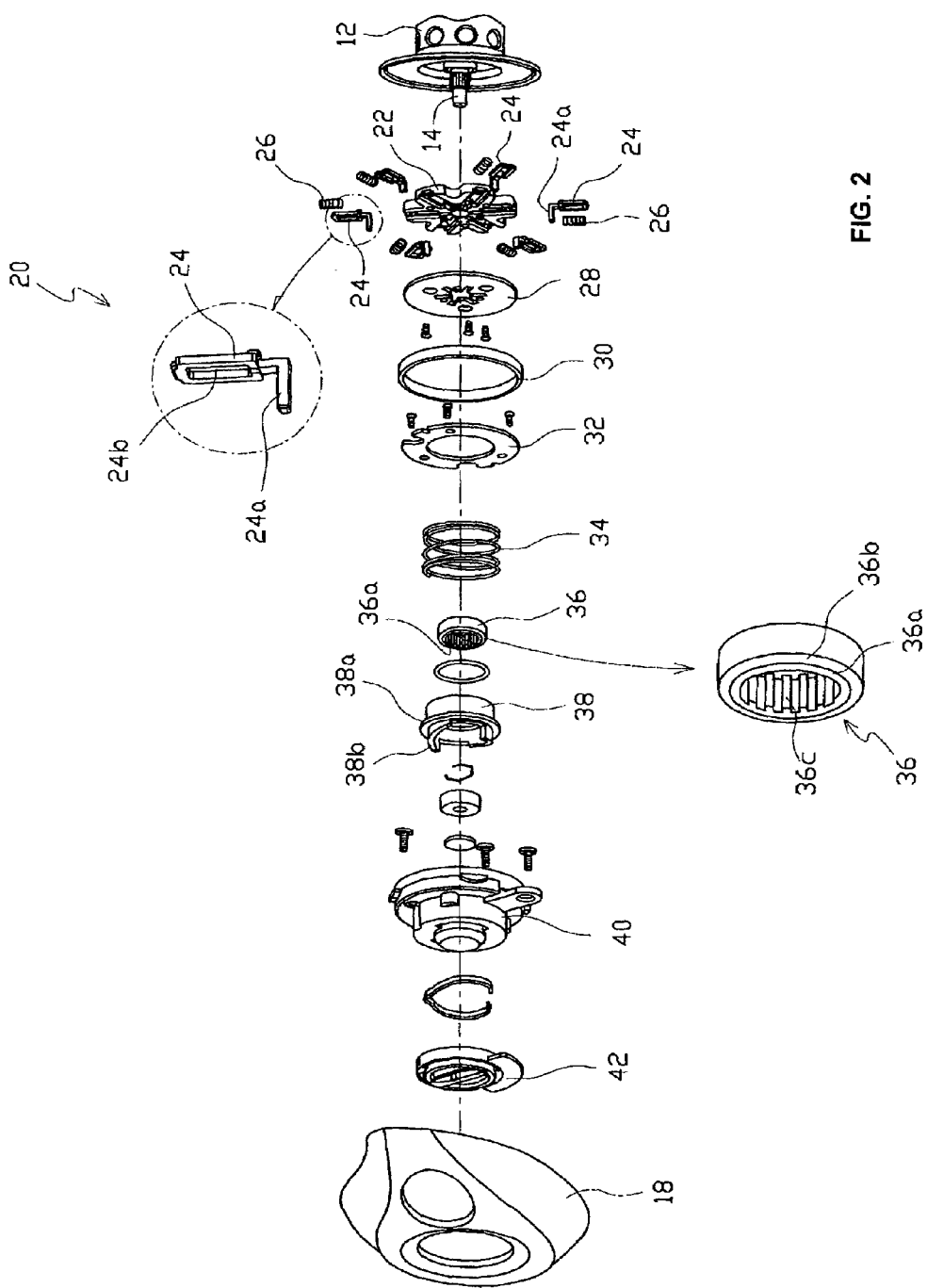
FIG. 2 is an exploded perspective view illustrating a construction of an anti-backlash apparatus built in the bait reel of FIG. 1.
Figure 3:
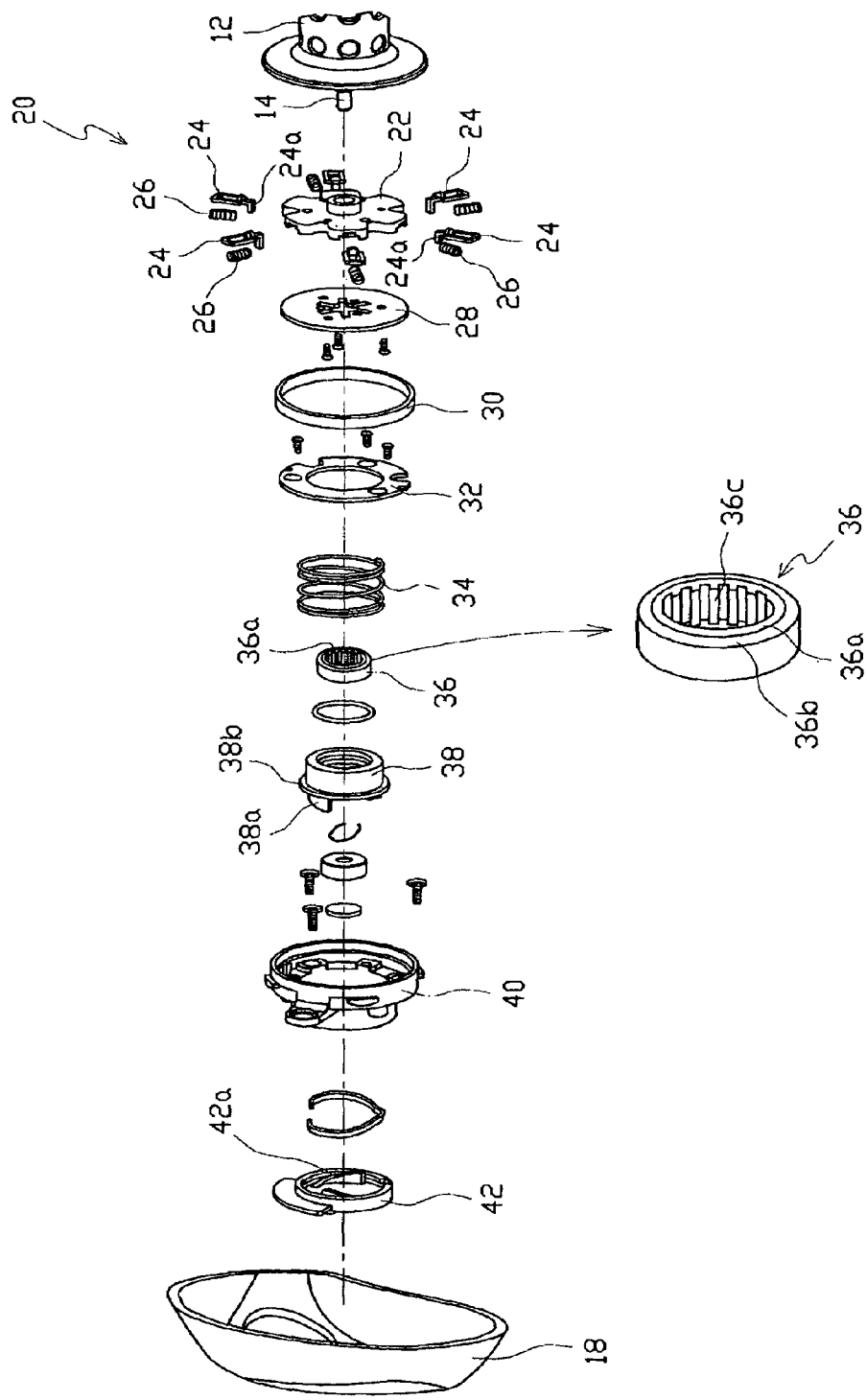
FIG. 3 is a bottom and exploded perspective view illustrating a construction of the anti-backlash apparatus shown in FIG. 2.
Figure 4:
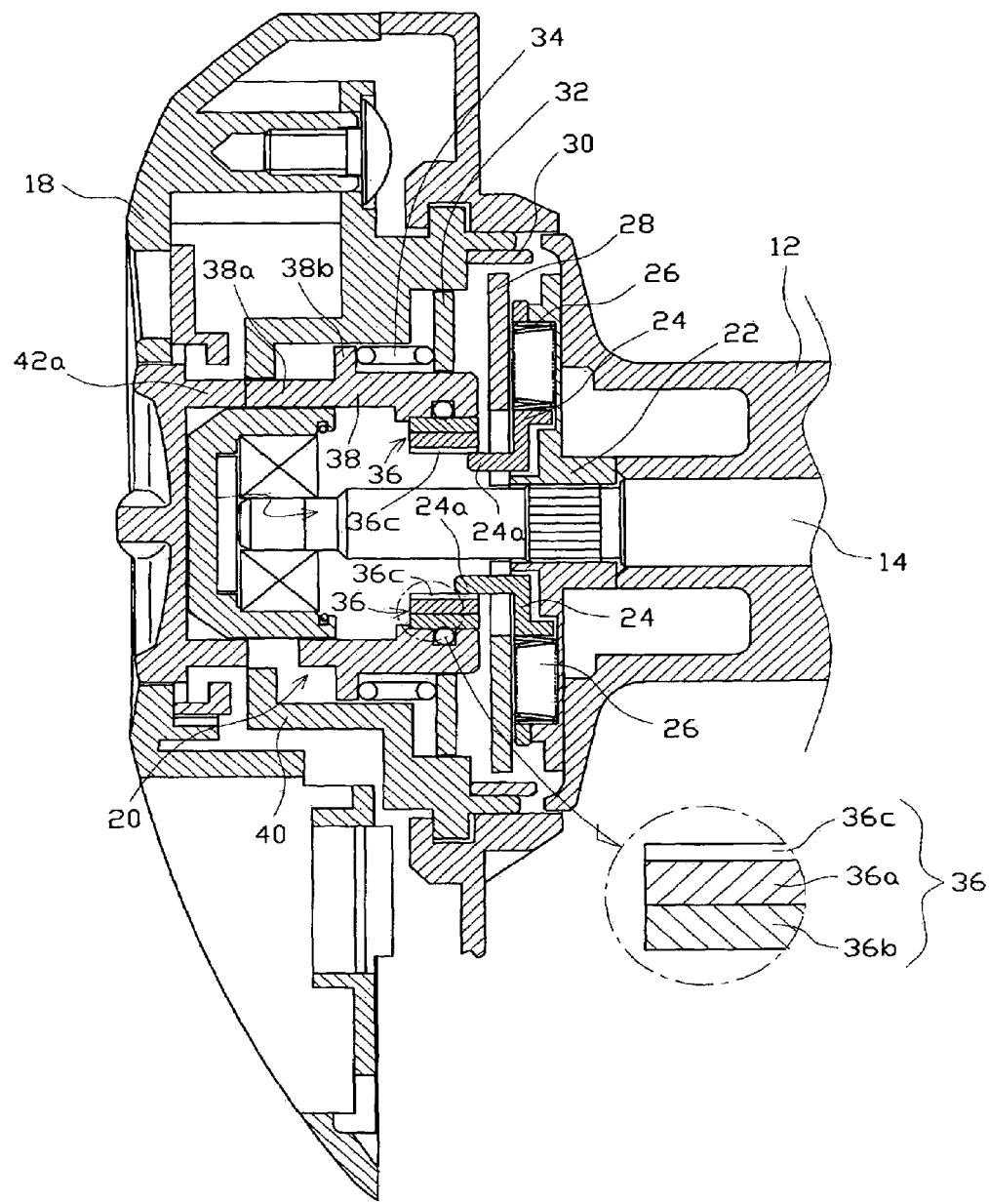
FIG. 4 is a cross sectional view illustrating a cutaway of an assembly structure of an anti-backlash apparatus for a bait reel according to the present invention.

FIGS. 2 to 4 illustrate a construction of the anti-backlash apparatus 20.

As shown in FIGS. 2 to 4, the anti-backlash apparatus 20 includes a brake shoe holder 22, a brake shoe 24, a brake ring 30, a stopper holder 38, and a stopper 36.

The brake shoe holder 22 holds the brake shoes 24, and connects to a shaft 14 of the spool 12 and rotates together with the spool 12.

The brake shoe 24 is structured such that a locking part 24a is vertically bent to have an "⌐"-shape at its one end, and is radially fitted in plural into the brake shoe holder 22. The locking part 24a, described later, is locked at an inner circumference surface of the stopper 36, and restricts an outside movement of the brake shoe 24 based on a centrifugal force caused by a rotation of the spool 12.

The brake shoes 24 are all manufactured in the same structure. It is characterized that the locking parts 24a bent and provided at the respective brake shoes 24 are manufactured at different lengths. This will be described later, but is to, when the locking parts 24a are locked at the stopper 36, allow the locking parts 24a to be gradationally locked with each other so that, when the stopper 36 moves, they can be selectively released from the stopper 36.

In state where the brake shoes 24 are radially fitted into the brake shoe holder 22 as above, they move outside by the centrifugal force arising at the time of rotating the spool 12, and cause friction in contact with an inner circumference surface of the brake ring 30, thereby controlling the rotation of the spool 12.

The brake shoes 24 have through-holes 24b at their centers. Springs 26 are inserted into the through-holes 24b, respectively. The spring 26 elastically supports the moving brake shoes 24. The brake shoes 24 are adhered to a guide disk 28 at their one-side surfaces. The guide disk 28 guides movements of the brake shoes 24.

The brake ring 30 is positioned and spaced by a predetermined distance outside the brake shoes 24. Moving by the rotation of the spool 12, the brake shoes contact with the moving brake shoes 24 and generate the friction force.

The stopper holder 38 supports the stopper 36 inserted therein, and reciprocates and moves left/right by a rotation operation of a dial 42. The dial 42 is mounted at a center of the side cover 18 and in that state, reciprocates and moves the stopper holder 38 left/right by its rotation motion.

A connection structure of the stopper holder and the dial will be described below.

An inclination edge 38a is provided at a side surface of the stopper holder 38. An inclination edge 42a corresponding to the inclination edge 38a of the stopper holder 38 is provided at a side surface of the dial 42. In other words, in state where the inclination edge 38a of the stopper holder 38 and the inclination edge 42a of the dial 42 are in surface contact with each other, when the dial 42 rotates clockwise, the stopper holder 38 can move to the left by an inclination angle between the inclination edges 38a and 42a. The stopper holder 38 elastically moves to the left by a tension force of the spring 34 that is provided at its circumference surface. The stopper holder 38 moving to the left is elastically pushed to the right owing to an opposite rotation, that is, a counterclockwise rotation of the dial 42.

In state where the spring 34 is positioned between a flange 38a provided at the circumferential surface of the stopper holder 38 and the disk 32 provided within the side cover 18, it elastically supports the movement of the stopper holder 38.

In state where the stopper 36 is inserted into the stopper holder 38, it rotates in engagement with the left/right movement of the stopper holder 38. The stopper 36 having a ring shape is locked by the locking parts 24a of the brake shoes 24 at its inner circumference surface. Thus, the stopper 36 restricts the outside movements of the brake shoes 24. While the stopper 36 moves together with the stopper holder 38, the locking parts 24a of the brake shoes 24 are released from the stopper 36, thereby terminating the restriction on the brake shoes. Being manufactured at lengths different from each other, all the locking parts 24a are not simultaneously released from the stopper 36 by the movement of the stopper 36, and are sequentially released one by one, respectively, starting from the locking part 24a having a short length, depending on a movement distance of the stopper 36.

It is desirable that the stopper 36 is manufactured in a bearing type where an inner ring 36a and an outer ring 36b are separately rotated.

In other words, the reason why the stopper 36 is manufactured in the bearing type is that, when the spool 12 rotates together with the brake shoe 24, the locking jaw 24a of the brake shoe 24 rotates together in contact with the inner ring 36a of the stopper 36, thereby minimizing a friction with the inner ring 36a and not separately controlling the rotation of the spool 12.

In case where the stopper 36 is manufactured in the bearing type in which the inner ring 36s and the outer ring 36b separately rotate, it is desirable that a plurality of protrusions 36c are provided on the inner circumference surface of the inner ring 36a. The protrusions 36c hold and allow the locking jaw 24a of the brake shoe 24 contacting with the inner ring 36a of the stopper 36 not to be slid and separately brake the rotating spool 12 at the time of rotating the spool 12.

In case where the stopper 36 is manufactured in a single ring type not in the bearing type, it is desirable that the stopper 36 is manufactured using material having a good sliding on its inner circumference surface. This is to, when the spool 12 rotates, allow the locking jaw 24a of the brake shoe 24 to minimize the friction force in its contact with the inner circumference surface of the stopper 36, thereby not separately controlling the rotation of the spool 12.

A non-described reference numeral 40 denotes a spool cover 40 provided within the side cover 18 and covering one side of the spool 12.

An operation of the anti-backlash apparatus for the bait reel according to the present invention will be described with reference to FIGS. 4 to 6 below.

Figure 5:
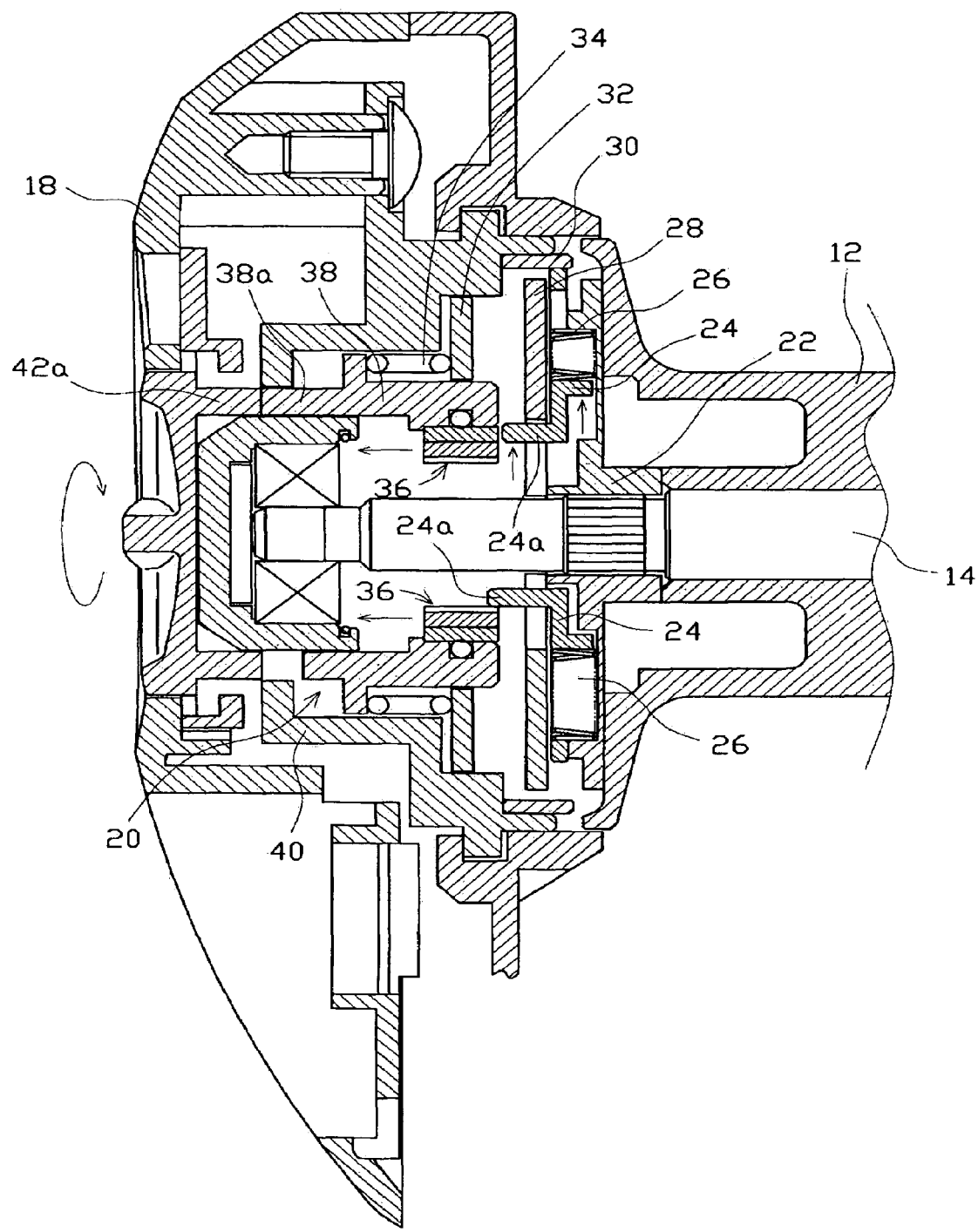
FIGS. 5 and 6 illustrate operation states of an anti-backlash apparatus for a bait reel according to the present invention.
Figure 6:
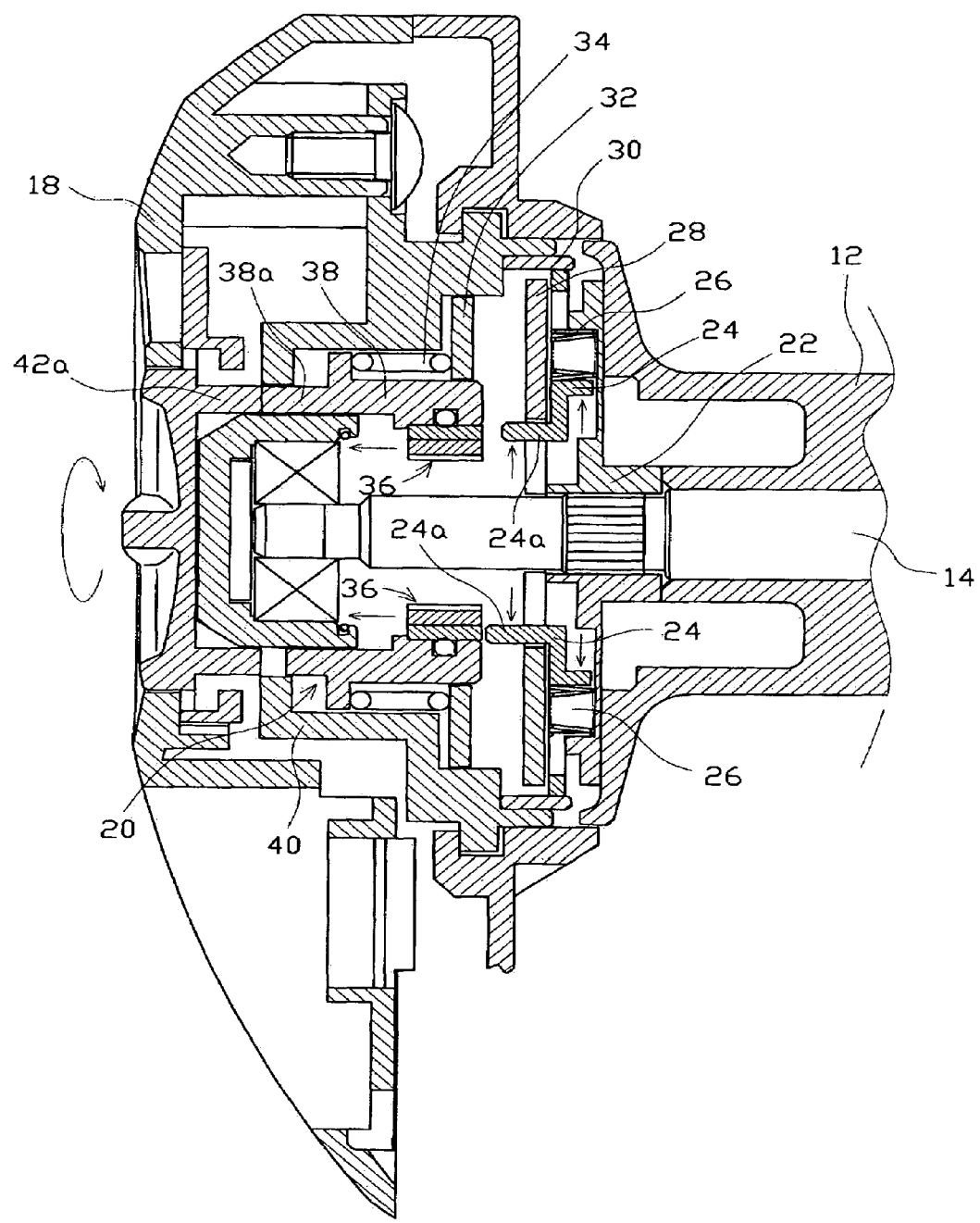

FIGS. 4 to 6 show typical operations of two of the plurality of brake shoes 24 causing friction with the brake ring 30, preferably, a brake shoe 24 having a first shortest length of locking part 24a and a brake shoe 24 having a second shortest length of locking part 24a. The brake shoes other than the two brake shoes 24 sequentially operate one by one in the same method. Only operations of the two brake shoes shown in FIGS. 4 to 6 will be in detail described below.

FIG. 4 illustrates a state where the spool 12 is not given a brake power (force for controlling rotation). As shown in FIG. 4, the locking parts 24a provided at the two brake shoes 24 are locked at the inner circumference surface of the stopper 36 inserted into the stopper holder 38, such that, even when the spool 12 rotates, the brake shoes 24 do not move outside. Thus, the brake shoes do not cause the friction with the brake ring 30. In other words, when the friction between the brake shoe 24 and the brake ring 30 is not caused as shown in FIG. 4, the spool 12 is given no brake power in its rotation, thereby rotating at a high speed.

FIG. 5 illustrates a state where the spool 12 is given a first brake power. As shown in FIG. 5, when the dial 42 clockwise rotates by a predetermined angle, the stopper holder 38 contacting with the dial 42 by the inclination edges 38a and 42a moves to the left by the tension force of the spring 34. Thus, the stopper 36 inserted into the stopper holder 38 also moves to the left by a predetermined distance together with the stopper holder 38.

When the stopper 36 moves to the left, one having a shorter length, of the locking parts 24a respectively provided to the two brake shoes 24 is released from the stopper 36. Thus, the brake shoe 24 having the locking part 24a of the shorter length is unrestricted and moved outside owing to the centrifugal force caused by the rotation of the spool 12. After that, the brake shoe 24 contacts with the brake ring 30 and generates the friction force. By the friction force, the rotating spool 12 is given the first brake power.

FIG. 6 illustrates a state where the spool 12 is given a second brake power. In other words, when the dial 42 again clockwise rotates in the state of FIG. 5, the stopper holder 38 contacting with the dial 42 by the inclination edges 38a and 42a keeps moving to the left by the tension force of the spring 34. Thus, the stopper 36 inserted into the stopper holder 38 keeps moving as well.

When the stopper 36 moves to the left away more than in FIG. 5, even the locking part 24a having a longer length among the locking parts 24a of the brake shoes 24 is released from the stopper 36. Thus, the two brake shoes 24 are all unrestricted and moved outside owing to the centrifugal force caused by the rotation of the spool 12. After that, the two brake shoes 24 contact with the brake ring 30, respectively, and generate the friction force. In other words, when contacting with the brake ring 30, the two brake shoes 24 generate a greater friction force than when one brake shoe 24 causes friction, thereby applying a greater brake power to the rotating spool.

As described above, in the anti-backlash apparatus according to the present invention, the control, that is, the brake power against the rotation of the spool 12 can be stepwise controlled according to a fisherman's request.

As described above, the present invention has an effect that the rotary force of the spool can be controlled outside even with the side cover not disassembled, thereby providing a convenience in use.

Further, the present invention has an effect that the brake power against the spool can be delicately controlled in several steps according to the fisherman's request, thereby, when fishing is performed, dynamically controlling the brake power against the spool under the then circumstances.

While the present invention has been described with reference to exemplary embodiments thereof, it will be apparent to those skilled in the art that various modifications can be made therein without departing from the spirit and scope of the invention as defined by the appended claims and their equivalents.

What is claimed is:

1. An anti-backlash apparatus for a bait reel, provided within the bait reel and selectively controlling a rotational friction of a spool by a rotation operation of a dial, the apparatus comprising:

a brake shoe holder connecting to the spool;

a plurality of brake shoes operably coupled with the brake shoe holder, and moveable in a radial direction in association with a rotation of the spool to provide a frictional contact with a brake ring;

a stopper provided at one side of the brake shoe holder, and restricting movements of the brake shoes;

a stopper holder coupled with the stopper, and moveable forward and backward depending on by rotation of the dial; and locking parts each vertically bent and provided at an end of each of the brake shoes, each locking part being lockable at an inner circumference surface of the stopper for restricting the movement of the brake shoe in the radial direction, and the locking parts having lengths different from each other such that they can be alternately locked at the inner circumference surface of the stopper and released therefrom as the dial rotates and moves the stopper out of engagement with each of the vertically bent locking parts.

2. The apparatus according to claim 1, wherein the stopper is provided in a bearing type having an inner ring, and an outer ring fitted to an outside of the inner ring and separately rotating with the inner ring.

3. The apparatus according to claim 2, wherein a plurality of protrusions are provided on an inner circumference surface of the inner ring.

4. The apparatus according to claim 2, wherein the inner ring rotates always together when the spool rotates.

5. The apparatus according to claim 1, wherein the stopper is provided in a single ring type having a low sliding friction on its inner circumference surface.

* * * * *